United States Patent [19]

Takayama et al.

[11] Patent Number: 4,682,232
[45] Date of Patent: Jul. 21, 1987

[54] CAPACITOR COUPLED CIRCUIT

[75] Inventors: Tsutomu Takayama; Seiji Hashimoto; Toshio Kaji; Masao Suzuki; Akihiko Tojo, all of Kanagawa, Japan

[73] Assignee: Canon Kabushiki Kaisha, Tokyo, Japan

[21] Appl. No.: 784,843

[22] Filed: Oct. 4, 1985

[30] Foreign Application Priority Data

Oct. 11, 1984 [JP] Japan ............................... 59-211485

[51] Int. Cl.⁴ ........................ H04N 5/16; H04N 5/18
[52] U.S. Cl. .................................. 358/172; 358/171; 358/209
[58] Field of Search ............... 358/213, 221, 171, 172, 358/909

[56] References Cited

U.S. PATENT DOCUMENTS 4,178,558 12/1979 Nagashima et al. ............... 358/172
4,399,466 8/1983 Stephenson ........................ 358/221
4,435,730 3/1984 Bendell et al. ..................... 358/213
4,470,066 9/1984 Wölber et al. ..................... 358/171
4,498,105 2/1985 Crawshaw .......................... 358/221
4,549,215 10/1985 Levine ................................ 358/213

Primary Examiner—Gene Z. Rubinson
Assistant Examiner—Stephen Brinich
Attorney, Agent, or Firm—Toren, McGeady & Associates

[57] ABSTRACT

A capacitor coupled circuit includes a power supply switch for switching power supply on; a coupling capacitor provided in a signal line; and a control circuit arranged to cause the capacitor to be charged or to be discharged in a short period of time according to the operation of the power supply switch. The arrangement enables the capacitor coupled circuit to obtain a stabilized constant output voltage in a short period of time after the power supply is switched on.

18 Claims, 8 Drawing Figures

CAPACITOR COUPLED CIRCUIT

BACKGROUND OF THE INVENTION

1. Field of the Invention

This invention relates to a capacitor coupled circuit, and more particularly to a circuit capable of obtaining a stabilized constant output voltage within a short period of time after power supply is switched on.

1. Description of the Prior Art

The conventional capacitor coupled circuit, which is arranged, for example, for a video signal in a video camera or the like, has been arranged to have its time constant set at several ten to several hundred msec for the purpose of permitting passage of a video signal frequency band including a low zone thereof. Such being the arrangement, the conventional capacitor coupled circuit has required a long period of time before the output of the circuit settles down to a normal constant bias voltage FIG. 1 of the accompanying drawings shows an equivalent circuit representing the capacitor coupled circuit. The illustration includes a coupling capacitor C, a signal source impedance Rg, an input impedance Ri of a next stage, a signal source bias voltage V1 and an input bias voltage V2 of a next state.

FIG. 2 shows the transient characteristic of the output voltage V of the above-stated circuit. The illustration includes a point of time t0 at which a power supply is switched on, a point of time t1 at which the level of the power supply rises, and another point of time t2 at which there obtains bias stabilization. A curve between the points of time t1 and t2, representing the stabilizing manner of the above-stated voltage, can be expressed by a formula $$V + V1 - (V1 - V2) \cdot \exp\left(\frac{-t}{(Rg + Ri)C}\right).$$

As mentioned above, a long period of time, of about several ten to several hundred msec., has been necessary between the points of time t0 and t2 after the power supply is switched on.

Further, in the video camera mentioned above, a pulse clamping circuit which reestablishes the direct-current level of a video signal, is provided in the latter part of the capacitor coupled circuit. However, charging and discharging operations on a clamping capacitor, which serves as a coupling capacitor, must be accomplished within a very short horizontal blanking period, during which clamping pulses are supplied. Therefore, in the event of a momentary voltage change, such as a change that takes place when the power supply is switched on, a period of several msec. has been required before stabilization to a constant voltage is achieved.

FIG. 3 shows an example of arrangement of the above-stated conventional pulse clamping circuit. FIG. 4 shows the transient characteristic of the output voltage V of this pulse clamping circuit relative to clamping pulses P1. In FIG. 3, the elements similar to those shown in FIGS. 1 and 2 are indicated by the same reference symbols. These illustrations include the clamping capacitor C which serves as a coupling capacitor; a clamping switch SW1; a clamping voltage source 15 which is a power source; a resistor Ron which is arranged to be connected to the clamping capacitor C when the clamping switch SW1 turns on; and a clamping voltage Vcp.

Referring to FIG. 4, after, power supply is switched on at a point of time t0, the voltage V rises at a point of time t1 and comes to settle down at a time point t2. A curve representing the stabilization of this voltage is expressed by a formula: $V = V1 - (V1 - V2) \cdot \exp(-t/\tau)$, (wherein $\tau$ represents a value $\tau on = (Rg + Ron)C$ when the clamping switch SW1 is on and another value $\tau off = (Rg + Ri)C$ when the switch is off. As indicated by the curve, a period of several msec. is required between the time points t0 and t2 before stabilization. This shortcoming of the prior art arrangement is negligible for an apparatus such as a video camera adapted for sensing images over a long period of time. Whereas, in the case of an apparatus adapted for taking a still picture, such as a still picture video camera, an image sensing operation must be accomplished by stabilizing its circuit in a short period of time. Therefore, the above-stated shortcoming has presented serious problem for the apparatuses of that kind.

SUMMARY OF THE INVENTION

The present invention is directed to the solution of the above-stated problem. It is therefore an object of the invention to provide a capacitor coupled circuit which is capable of coming to give a stabilized constant output in a much shorter period of time than the conventional capacitor coupled circuit by virtue of a simple circuit added to the arrangement of the conventional circuit described above.

A circuit arranged according to this invention as a preferred embodiment thereof is capable of giving a stabilized image signal output in a short period of time after switching on of power supply with a simple circuit added to the arrangement of the conventional capacitor coupled circuit.

The above and further objects and features of the invention will become apparent from the following detailed description of preferred embodiments thereof taken in connection with the accompanying drawings.

DETAILED DESCRIPTION OF THE PREFERRED EMBODIMENTS

Figure 5:
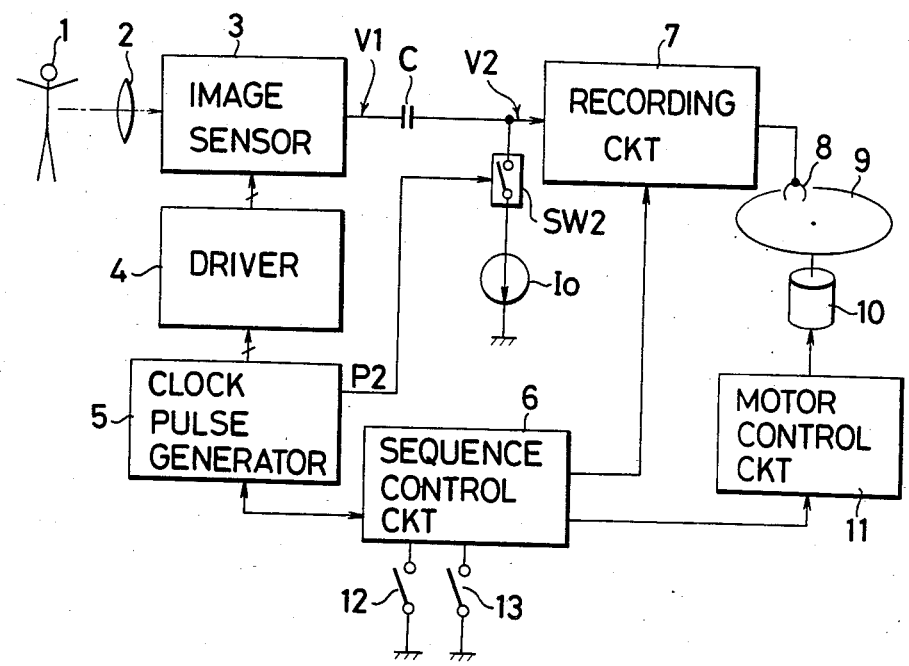
FIG. 5 is a circuit diagram showing a first embodiment of this invention.
Figure 6:
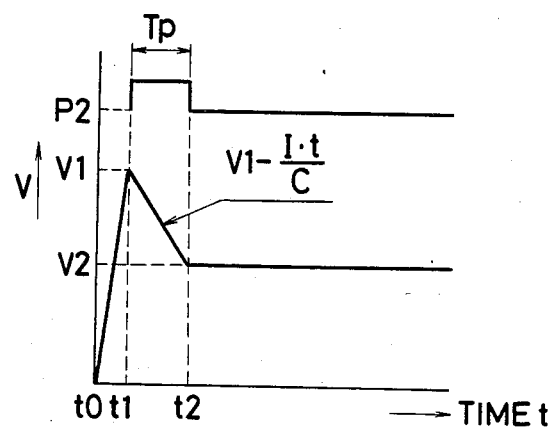
FIG. 6 is a graph showing the transient characteristic of the output voltage of the first embodiment relative to a pulse.

The following describes this invention in comparison with the example of the conventional capacitor coupled circuit described in the foregoing: FIG. 5 is a circuit diagram showing a first embodiment of this invention. FIG. 6 shows the transient characteristic of the output voltage V of the embodiment in relation to a pulse P2. In these drawings, the elements corresponding to those shown in FIGS. 1 and 2 are indicated by the same reference symbols.

Figure 1:
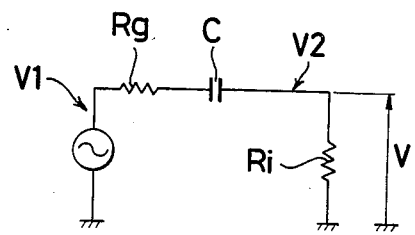
FIG. 1 is a diagram showing an example of the conventional capacitor coupled circuit.
Figure 2:
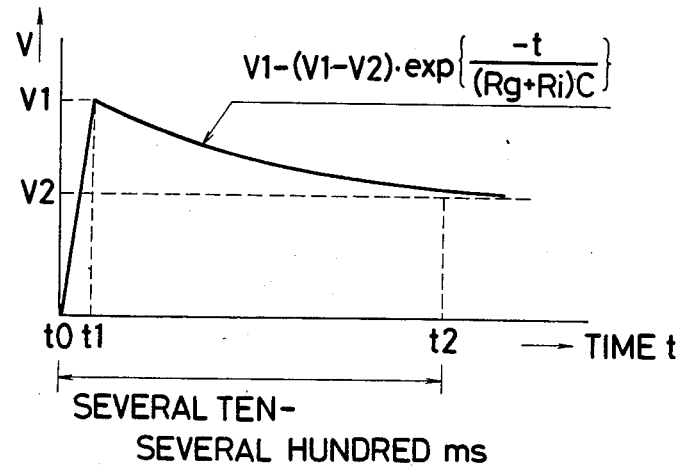
FIG. 2 is a graph showing the transient characteristic of the output voltage of the same circuit.

Referring to FIG. 5, a constant current source I0, which is arranged to have a constant current I flow into or flow out of the capacitor coupled circuit of FIG. 1, and a switch SW2 for this constant current source I0 are added to the capacitor coupled circuit and are incorporated into an image sensing device along with the latter. The illustration includes an object 1 to be photographed; an image sensing optical system 2; an image sensor 3; a driver 4 arranged to drive the image sensor 3; a clock pulse generator 5 arranged to supply various clock signals to the driver 4 and a sequence control circuit 6, which is arranged to control the sequence of the whole iamge sensing device; a recording circuit 7 arranged to convert a signal obtained via a coupling capacitor C into a signal suited for recording; a recording head 8; a record bearing medium 9; a motor 10 arranged to rotate the record bearing medium 9; a motor control circuit arranged to cause the motor 10 to rotate at a predetermined speed and at a predetermined phase in synchronism with a synchronization signal; a power supply switch 12; and an image recording switch 13. The current of the constant current source I0 is arranged to flow outward when the level of a signal source voltage V1 is higher than an input voltage V2 of the next stage and inward when the former is lower than the latter. The magnitude of the constant current I is obtained from a potential difference between the voltages V1 and V2, a period of time Tp during which the switch SW2 is on and the capacity of the coupling capacitor C by computation carried out according to the following formula:

$$I = \frac{C(V2 - V1)}{Tp}.$$

The period of time Tp can be shortened by increasing the constant current I. With the embodiment arranged as described above, the switch SW2 is turned on by applying a high level pulse P2 to the switch SW2 for the period of time $$Tp = \frac{C(C2 - V1)}{I}$$

from a point of time t1 at which the power supply level rises after the power supply switch 12. Therefore, the length of time up to a point of time t2 at which the bias voltage comes to stabilize becomes much shorter than the conventional arrangement. The enbodiment is thus capable of giving a stabilized picture signal in a very short period of time.

Figure 3:
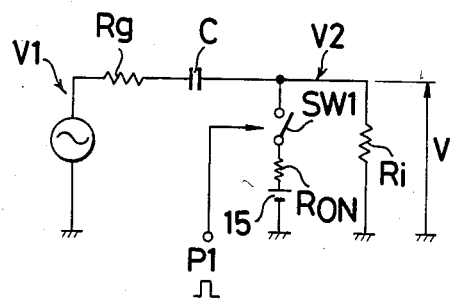
FIG. 3 is a circuit diagram showing an example of the conventional pulse clamping circuit.
Figure 4:
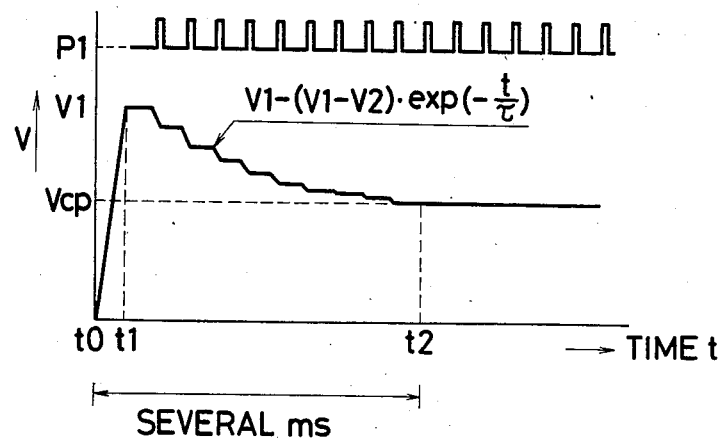
FIG. 4 is a graph showing the transient characteristic of the output voltage of the same pulse clamping circuit relative to pulses.
Figure 7:
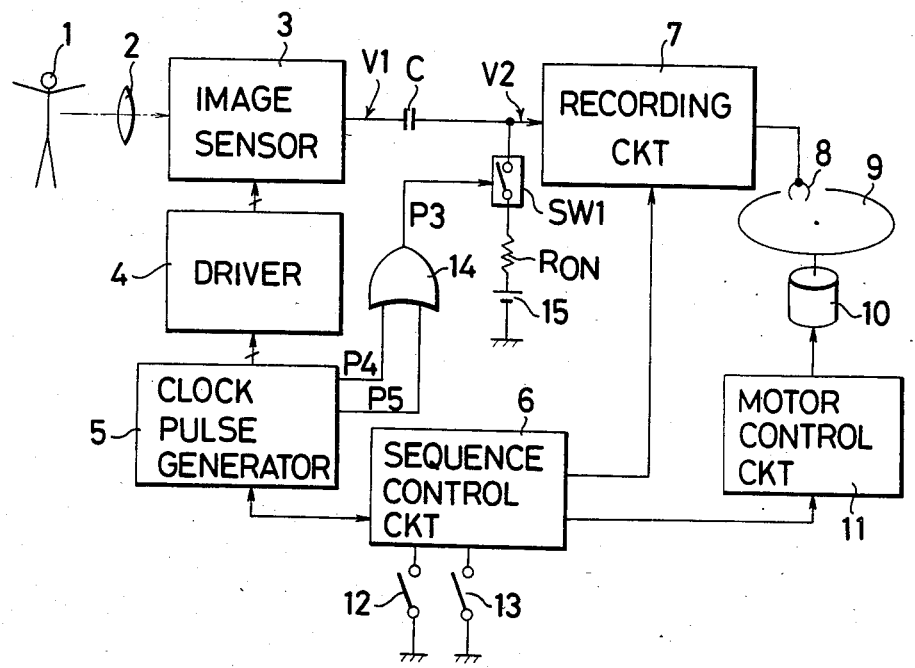
FIG. 7 is a circuit diagram showing a second embodiment of this invention.
Figure 8:
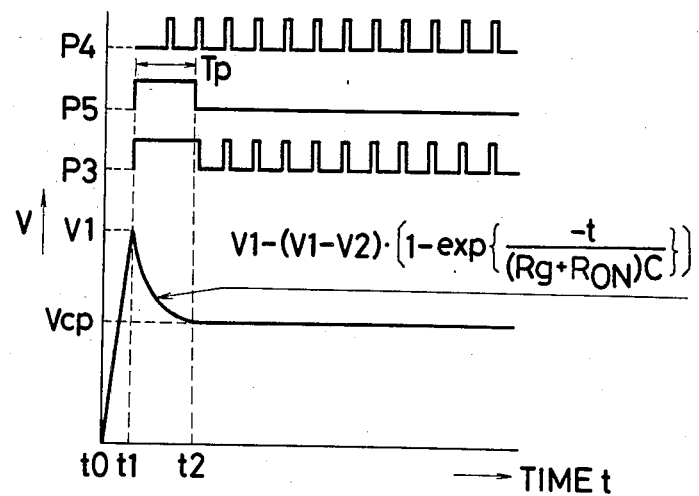
FIG. 8 is a graph showing the transient characteristic of the output voltage of the second embodiment in relation to pulses.

FIG. 7 shows the circuit arrangement of a second embodiment of this invention. FIG. 8 shows the transient characteristic of a voltage V in relation to pulses P3, P4 and P5. In FIG. 7, the parts corresponding to those shown in FIGS. 1 to 6 are indicated by the same reference symbols and numerals. In the case of FIG. 7, the pulse clamping circuit of FIG. 3 is arranged to use the pulses P3 for controlling the clamping switch SW1. The pulses P3 are obtained from an OR circuit 14 which is arranged to logically add up the clamping pulse P4 produced for every horizontal blanking period and the pulse P5 having a width corresponding to the period of time Tp (between the points of time t1 and t2) for which the clamping switch SW1 is arranged to be on after the power supply switch 12 is turned on. Therefore, after the power supply is switched on at the point of time t0, the electric charge of the clamping capacitor C, which serves as coupling capacitor, is discharged at a small time constant, i.e. during the above-stated period of time Tp, so that the image signal soon stabilizes. The period of time Tp is set at least at a value required for allowing the clamping output to settle down to the clamping voltage Vcp. With the embodiment arranged in the above-stated manner, the length of time between the point of time t0 at which the power supply is switched on to another point of time t2 at which the clamping voltage stabilizes is shortened to a great degree, so that a stabilized image signal can be promptly obtained.

In a further embodiment, the clock pulse generator 5 of the clamping circuit has the clamping pulse P4 arranged to have such a width that it is produced just for the period of time Tp immediately after the power supply is switched on. The same advantage of the invention as that of the embodiment described in the foregoing can be also obtained by that arrangement.

What is claimed is:

1. A capacitor coupled circuit comprising:
   (a) instructing means for instructing said capacitor coupled circuit to start an operation;
   (b) a coupling capacitor disposed in a signal line;
   (c) a current source circuit for flowing a predetermined level of current into or out of said coupling capacitor; and
   (d) a timing signal producing circuit for producing a timing signal to said current source circuit in such a manner that said coupling capacitor is made to effect a charging or discharging by said current source circuit in synchronism with the instruction action of said instructing means.

2. A circuit according to claim 1, wherein said current source circuit includes a clamping power source.

3. An image sensing apparatus comprising:
   (a) image sensing means;
   (b) clamping means for clamping the output of said image sensing means;
   (c) a capacitor arranged between said image sensing means and said clamping means to cut the DC component of the output of said image sensing means;
   (d) processing means for processing the output of said clamping means;
   (e) an actuating switch for starting an operation of said processing means; and
   (f) control means for controlling said clamping means in such a manner as flowing a predetermined current to said capacitor in synchronism with an action of said actuating switch.

4. An apparatus according to claim 3, wherein said clamping means is arranged to periodically clamp, to a predetermined potential, a signal produced through said capacitor.

5. An apparatus according to claim 4, wherein said clamping means includes a clammping power source; and a clamping switch circuit which is arranged to periodically connect to said clamping power source said signal produced through said capacitor.

6. An apparatus according to claim 5, wherein said clamping power source includes a constant current source.

7. An apparatus according to claim 5, wherein said control means is arranged to so control said clamping switch circuit that said predetermined current flows from said clamping power source to said capacitor for a predetermined length of time in synchronism with the action of said actuating switch.

8. A signal processing device comprising:
   (a) a signal input channel;
   (b) a capacitor arranged within said channel to cut the DC component of an input signal;
   (c) processing means for processing a signal produced through said capacitor;
   (d) an actuating switch for starting an operation of said processing means; and
   (e) a constant current source circuit for flowing a predetermined current to said capacitor in synchronism with an action of said actuating switch.

9. A device according to claim 8, wherein said constant current source circuit includes a switch circuit.

10. A device according to claim 8, wherein said constant current source circuit is disposed in between said capacitor and said processing means.

11. An information signal processing device for processing an information signal, comprising:
   (a) instructing means for instructing said information signal processing device to start an operation;
   (b) a capacitor for eliminating a direct current element of a DC component of said information signal;
   (c) a current source circuit for flowing a predetermined current into or out of said capacitor;
   (d) detecting means for detecting whether an instruction by said instructing means for said starting operation has been given or not; and
   (e) control signal producing means for outputting a control signal to said current source circuit in such a manner that said capacitor is made to effect a charging or a discharging by said current source circuit in synchronism with a detection timing in said detecting means.

12. A capacitor coupled circuit, comprising:
   (a) a coupling capacitor disposed in a signal line;
   (b) a current source circuit being capable of supplying a predetermined current to said coupling capacitor; and
   (c) control means having a first mode in which said current source circuit flows said predetermined current to said coupled capacitor periodically for a first period of time and a second mode in which said current source circuit flows said predetermined current to said coupled capacitor for a second period of time which is longer than said first period of time, and controlling said current source circuit in such a manner that said current source circuit flows said predetermined current to said coupling capacitor based on said first mode or said second mode.

13. A circuit according to claim 12, wherein said capacitor coupled circuit further comprises instructing means for instructing said capacitor coupled circuit to start an operation.

14. A circuit according to claim 13, wherein said control means is so arranged as controlling said current source circuit in said second mode for a predetermined length of time after said instructing means instructs a start of the operation.

15. A circuit according to claim 12, wherein said current source circuit includes a clamping power source.

16. A circuit according to claim 12, which is so arranged that a video information signal is supplied to said coupling capacitor.

17. A circuit according to claim 16, wherein said capacitor coupled circuit further comprises horizontal synchronizing signal producing means for producing a horizontal synchronizing signal.

18. A circuit according to claim 17, wherein said control means is so arranged as synchronizing with said horizontal synchronizing signal after an elapse of a predetermined length of time after the circuit is started, and as controlling said current source circuit in the first mode.

* * * * *